March 23, 1937. F. G. THWAITS 2,074,523
TANK ASSEMBLAGE
Filed Nov. 5, 1934
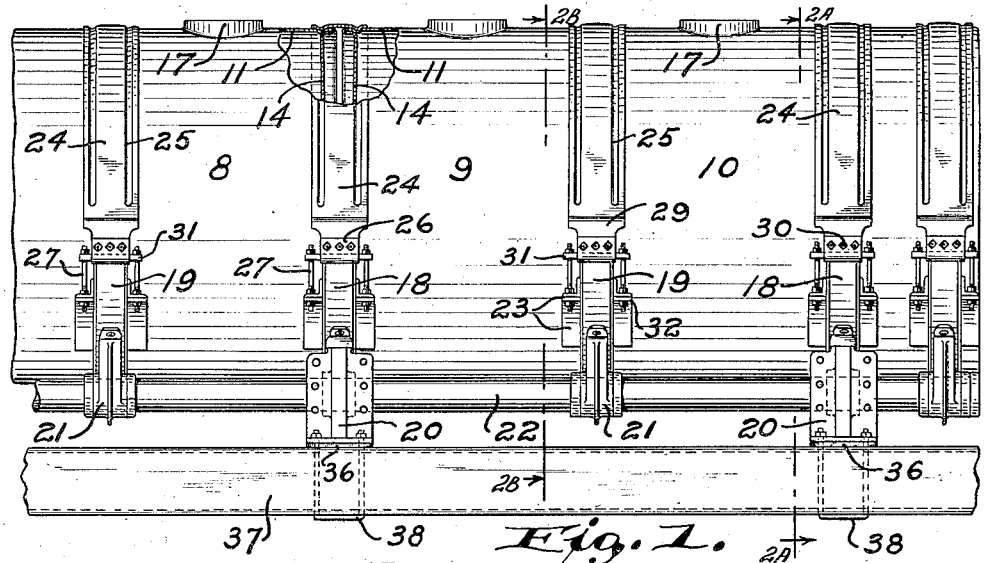
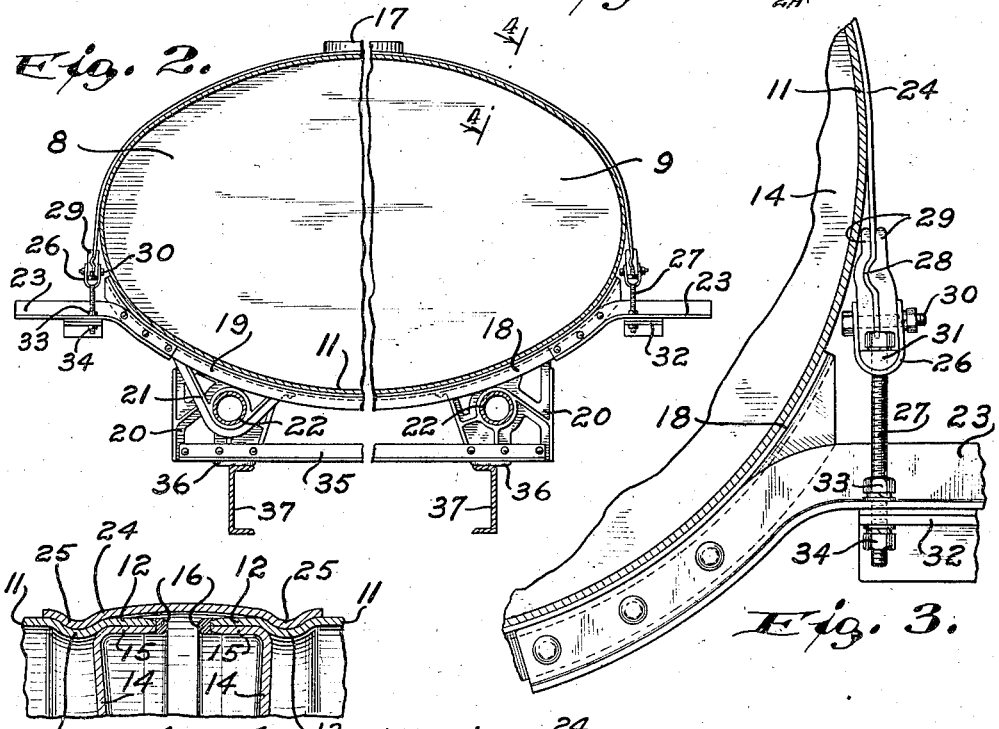
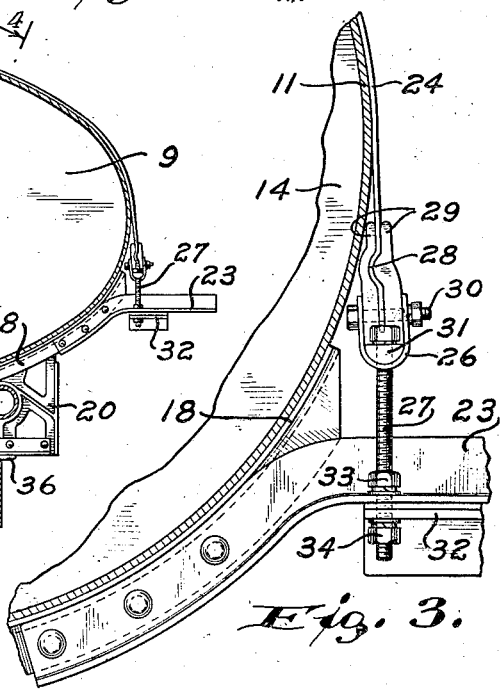
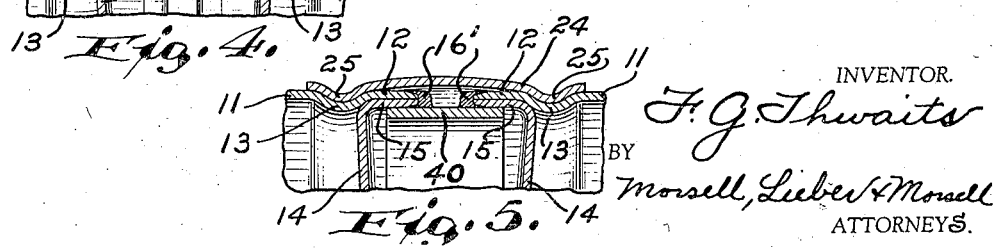
INVENTOR.
F. G. Thwaits
BY
Morsell, Lieber & Morsell
ATTORNEYS.

Patented Mar. 23, 1937

2,074,523

UNITED STATES PATENT OFFICE 2,074,523

TANK ASSEMBLAGE

Frederick G. Thwaits, Wauwatosa, Wis., assignor to The Heil Co., Milwaukee, Wis., a corporation of Wisconsin Application November 5, 1934, Serial No. 751,529

5 Claims. (Cl. 280—5)

The present invention relates in general to improvements in the art of fabricating receptacles, and relates more specifically to improvements in the construction of multiple compartment tanks especially adapted to be mounted upon a vehicle.

Generally defined, an object of the present invention is to provide various improvements in the construction of multiple compartment vehicle tanks, whereby such a receptacle can be readily manufactured to produce a simple, durable, and efficient final assemblage.

It has heretofore been proposed, as disclosed in my prior Patent No. 1,595,633, granted August 10, 1926, to provide a multiple compartment tank having the adjacent ends of the compartments provided with inwardly dished heads welded to the outer tank walls and to continuous connector bands disposed within integral flanges of the end heads. In this prior structure, the end head flanges were caused to extend outwardly beyond the adjoining walls of the compartments which they enclosed and within which they were snugly fitted, and the extreme ends of the outer compartment walls were welded to the medial portions of the head flanges, while the free ends of these flanges were welded to the medial portion of the connector band which was snugly fitted within the complementary head flanges. This double welding at the end of each of a pair of adjoining tank sections enhanced the cost of the tank structure, and the welding of the head flanges to the compartment walls produced unions which would not effectively resist all strains and could not be effectively utilized when the structures were formed of aluminum. The several compartments of this prior tank structure, moreover, could not be disconnected without destroying the connector bands, and no other means were provided for locking the tank sections to each other and to a support.

The present invention contemplates provision of improvements in multiple compartment tank structures especially adapted to be mounted upon vehicles, which obviate all of the defects of the prior tank structure hereinabove referred to, and which are especially applicable with advantage to aluminum tanks.

Some of the more specific objects of the present invention are as follows:

To provide an improved mode of welding the end heads into tanks, whereby the strength of the tank structure is unimpaired and the welded joints are relieved from shear stresses, and which is especially applicable to aluminum tank structures.

To provide a welded tank joint wherein a minimum number of welds may be utilized to connect the end heads to the tank walls, and to join the adjacent sections of a multiple compartment tank assemblage.

To provide an improved weld structure wherein the weld is applied to the outermost edges of the free ends of parallel flanges extending along the axis of a tank or the like, whereby irregularities due to burning away of some of the material during the welding operation do not prevent the final joint from effectively resisting expansion and contraction of the connected parts.

To provide an improved multiple compartment tank assemblage, wherein the successive tank sections may be effectively united to produce a unitary tank structure, or subsequently disconnected from each other.

To provide improved instrumentalities for mounting a tank structure upon a vehicle with the aid of anchoring straps, which may also be utilized to rigidly interconnect several tank sections.

To provide improved means for interconnecting adjacent tank sections, and for insuring alinement thereof without necessitating the use of special inner alining bands or tubes.

To provide an improved tank mounting wherein the tank structure is relieved of undue stresses, and which will enable rapid and effective attachment of a tank assemblage to a vehicle or other support.

These and other objects and advantages will be apparent from the following detailed description.

A clear conception of embodiments of the several features constituting the present improvement, and of the mode of constructing welded joints and of assembling tank structures in accordance with the invention, may be had by referring to the drawing accompanying and forming a part of this specification, in which like reference characters designate the same or similar parts in the various views.

Fig. 1 is a part sectional side elevation of a fragment of a multiple compartment tank, showing the same mounted upon the chassis of a vehicle;

Fig. 2 is an irregular transverse section thru the tank assemblage, the right half of the section being taken adjacent to one of the improved mounting brackets, along the line 2A—2A of Fig. 1 and the left half being taken adjacent to one of the intervening attaching saddles, along the line 2B—2B of Fig. 1;

Fig. 3 is an enlarged transverse fragmentary section thru the tank adjacent to one of the attaching straps and saddles, the section being taken along the line 2A—2A of Fig. 1;

Fig. 4 is an enlarged fragmentary section taken longitudinally of the tank assemblage thru the ends of adjacent compartments, and thru the compartment connecting strap, the section being taken along the line 4—4 of Fig. 2; and Fig. 5 is a similar section thru a modified tank compartment union.

While the invention has been shown and described herein as being specifically applied to a multiple compartment tank assemblage especially adapted to be mounted upon the chassis of a road vehicle, it is not intended to unnecessarily restrict the scope by such specific embodiment.

Referring to the drawing, the tank assembly of Figs. 1, 2 and 3 comprises in general a series of compartments 8, 9, 10, each having an elliptical shell 11 provided with opposite end projections or flanges 12 and a continuous depression 13 adjacent to each flange 12, and a dished end head 14 having an integral, outwardly projecting flange 15 disposed within and snugly fitting each of the shell flanges 12. The adjoining ends of each set of flanges 12, 15 lie in a common plane perpendicular to the tank axis and are chamfered as clearly shown in Fig. 4, being subsequently united by end welds 16 extending along the entire edges of these flanges and over the chamfered edge portions. Each of the individual compartments 8, 9, 10 is provided with an upper manhole 17 and a lower dispensing opening of usual form, and the adjacent compartments may be either detachably connected as in Fig. 4, or permanently united as in Fig. 5, depending upon the use to which the tank assemblage is to be put.

When the compartments 8, 9, 10 are detachably interconnected as in Figs. 1 and 4, the successive tank sections are mounted in successive saddles 18, 19, alternate saddles 18 being supported upon mounting brackets 20, and intervening alternate saddles 19 being provided with yokes 21, the brackets 20 and yokes 21, however, being rigidly attached to and interconnected by parallel, tubular braces 22, as clearly shown in Figs. 1 and 2. The saddles 18, 19 consist of reenforced, inverted channel bars adapted to snugly engage the lower portions of the tank compartments, and having outwardly projecting end members or angle irons 23 rigidly attached thereto. The upper and side portions of the end depressions 13 of the adjacent tank compartments are snugly engaged by releasable connecting straps 24 having distorted edge portions 25 interlocking with the depressions 13, and the lower ends of the straps 24 are firmly attached to slings 26 as shown in Fig. 3, and these slings 26 are detachably secured to the saddle angle irons 23 remote from the tank sections with the aid of adjustable threaded bolts 27. If the straps 24 are formed of aluminum or similar material, it is preferred to distort the strap ends and to clamp the distorted portions 28 between clamping blocks 29 which are clamped to the straps and simultaneously attached to the slings 26 by means of transverse bolts 30. In order to eliminate undesirable stresses on the slings 26, the upper heads of the attaching bolts 27 may be caused to coact with semi-circular blocks 31 resting in the slings 26 and projecting therebeyond, and the lower threaded end of the bolts 27 may be adjustably secured to the saddle channels 23 and to buffer and reenforcing plates 32, with the aid of nuts 33, 34 and lock washers coacting therewith. In this manner, the tank compartments 8, 9, 10 may be firmly but detachably secured to the saddles 18, 19 without subjecting the tank elements to undesirable stress, while at the same time neatly concealing the joints between the sections.

The projecting ends of the saddle angle irons 23 may be utilized for the detachable suspension of auxiliary storage housings between the wheels of the vehicle, and the yokes 21 provide a firm support for the intermediate saddles 19 without undesirably obstructing the space beneath the tank. The main mounting brackets 20 of each set are interconnected by braces 35, and are adapted to rest upon rubber or otherwise resilient buffers 36 which, in turn, coact with the side beams 37 of the vehicle chassis. The bracket 20 and braces 36 may be detachably attached to the chassis beams 37 by means of U-bolts 38 as disclosed in Fig. 1, and when these U-bolts 38 are released, the entire tank assemblage, including the supporting saddles 18, 19, is removable from the vehicle as a unit.

When the compartments 8, 9, 10 of the tank are permanently interconnected, as illustrated in Fig. 5, a continuous connector band 40 is inserted within the head flanges 15 of the adjacent compartments, and is united with the shell and head flanges 12, 15 by means of the same welds 16' which interconnect these flanges. The same type of joint concealing straps 24 may be utilized with this modification, as in the principal showing, for concealing the gap between the compartment ends, and for securing the tank to the supporting saddles 18, 19 and to the vehicle. In the modified type of welded joint, the ends of the flanges 12, 15 are also preferably chamfered, and it is to be noted that the two welds 16' constitute the sole means for connecting the shells 11 to the heads 14, and for uniting the tank flanges with the connector band 40.

When the tank assemblage has been constructed as shown in Figs. 1 to 4, inclusive, the individual compartments 8, 9, 10 are first assembled, welded, and finished, whereupon they may be mounted upon the saddles 18, 19 and readily connected thereto with the aid of the straps 24 and bolts 27. The successive saddles 18, 19 having been previously applied to the tubular beams 22, at points corresponding to the several joints of the tank assemblage, permanently space these saddles and cause them to provide firm supports for the ends of the compartments. When the straps 24 are applied to the top and side portions of the compartments 8, 9, 10, the depressed strap portions 25 engage the tank recesses 13 and thus lock the successive sections of the tank in alinement with each other, and against endwise separation. The clamping blocks 29 coacting with the distorted strap portions 28, insure firm connection of the straps 24 to the slings 26, and these slings are, in turn, firmly but detachably attached to the saddle angle irons 23 on opposite sides of the slings 26, by means of the bolts 27 and the nuts 33, 34 coacting therewith. The U-bolts 38 serve to firmly but removably attach the entire tank assemblage to the vehicle chassis 37, while the buffers 36 and the blocks 31 prevent subjecting the tank sections to undesirable stresses due to weaving of the vehicle structure.

The welds 16, 16' disposed at the extreme ends of the coacting flanges 12, 15 and the chamfering of the flange edges are of extreme importance, especially when the tank compartments are formed of aluminum plate. It is also important to utilize relatively wide flanges 12, 15 because the welding of aluminum often results in irregularities at the flange edges, which might otherwise destroy the utility of the flanges in resisting subsequent bending stresses on the welds 16, 16'. The single welds 16, 16' disposed at the extreme edges of the flanges 12, 15 obviously eliminate shear stresses, and the parallel disposition of these flanges one within the other eliminates detrimental effects due to expansion and contraction of the tank walls. When the inner band 40 is omitted, more effective welding of aluminum flanges 12, 15 is also made possible because of freer circulation of cooling air during the welding operation, which makes it possible to eliminate excessive burning due to the extreme heat. However, the use of the band 40 is sometimes desirable, and when such band is utilized, only two welds 16' are necessary in order to simultaneously connect the flanges 12, 15 and the band 40.

From the foregoing description it will be apparent that the present invention provides various improvements in tank assemblages, whereby the tank compartments may be effectively formed and united so as to provide a simple unitary structure. The welding constituting part of this invention is especially applicable to aluminum tanks, but may also be applied with advantage to other kinds of material, and while the tank mounting features are especially adapted for use in connection with road vehicles, these may also be more generally applicable.

It should be understood that it is not desired to limit this invention to the exact details of construction herein shown and described, for various modifications within the scope of the claims may occur to persons skilled in the art.

It is claimed and desired to secure by Letters Patent:

1. A tank assemblage, comprising, alined tank compartments having peripherally recessed adjacent ends, a saddle coacting with the lower portion of said compartment ends and terminating near the medial opposite side portions of said compartments, members projecting outwardly from said saddle below the ends thereof, a strap coacting with the top and side portions of said compartment ends and recesses and having depending ends provided with laterally extending projections, clamping blocks engaging said projections and secured to said strap ends, and adjustable means connecting said blocks and said members.

2. A tank assemblage, comprising, alined tank compartments having peripherally recessed adjacent ends, a saddle coacting with the lower portion of said compartment ends and terminating near the medial opposite side portions of said compartments, members projecting outwardly from said saddle below the ends thereof, a strap coacting with the top and side portions of said compartment ends and recesses and having depending ends provided with laterally extending projections, clamping blocks engaging said projections and secured to said strap ends, slings secured to said clamping blocks, and adjustable means connecting said slings and said members.

3. A tank assemblage, comprising, alined tank compartments having peripherally recessed adjacent ends, a saddle coacting with the lower portion of said compartment ends and terminating near the medial opposite side portions of said compartments, members projecting outwardly from said saddle below the ends thereof, a strap coacting with the top and side portions of said compartment ends and recesses and having depending ends provided with laterally extending projections, clamping blocks engaging said projections and secured to said strap ends, slings secured to said clamping blocks, pivot blocks coacting with said slings, and adjustable means directly connecting said pivot blocks and said members.

4. A tank assemblage, comprising, alined tank compartments having peripherally recessed adjacent ends, parallel tubular beams disposed beneath said tank, a saddle connecting said beams and coacting with the lower portion of said compartment ends and terminating near the medial opposite side portions of said compartments, members projecting outwardly from said saddle, a strap coacting with the top and side portions of said compartment ends and recesses and having depending ends provided with laterally extending projections, clamping blocks engaging said projections and secured to said strap ends, and adjustable means connecting said blocks and said members.

5. A tank assemblage, comprising, alined tank compartments having peripherally recessed adjacent ends, parallel tubular beams disposed beneath said tank, a saddle connecting said beams and coacting with the lower portion of said compartment ends and terminating near the medial opposite side portions of said compartments, members projecting outwardly from said saddle, a strap coacting with the top and side portions of said compartment ends and recesses and having depending ends provided with laterally extending projections, clamping blocks engaging said projections and secured to said strap ends, slings secured to said clamping blocks, pivot blocks coacting with said slings, and adjustable means directly connecting said pivot blocks and said members.

FREDERICK G. THWAITS.